United States Patent [19]
Borgström

[11] 3,946,208
[45] Mar. 23, 1976

[54] SERVICE METER WITH PULSE COUNTER

[75] Inventor: Lennart Carl Göte Borgström, Svangsta, Sweden

[73] Assignee: Record Taxameter AB, Halmstad, Sweden

[22] Filed: Mar. 18, 1974

[21] Appl. No.: 452,328

[30] Foreign Application Priority Data
Mar. 21, 1973 Sweden.............................. 7303989

[52] U.S. Cl. ...... 235/92 EA; 235/92 C; 235/92 MT; 235/92 R; 346/14 MR
[51] Int. Cl.² .......................................... G06M 3/06
[58] Field of Search ......... 235/92 C, 92 EA, 92 EL, 235/92 MT; 346/14 MR, 95; 335/140

[56] References Cited
UNITED STATES PATENTS

| | | | |
|---|---|---|---|
| 2,687,088 | 8/1954 | Hennessy et al. ............... | 235/92 EA |
| 3,179,948 | 4/1965 | Schilling et al. ...................... | 346/95 |
| 3,322,937 | 5/1967 | O'Brien............................. | 235/92 C |
| 3,387,187 | 6/1968 | Haight............................... | 235/92 C |
| 3,631,506 | 12/1971 | Nielsen ............................. | 235/92 C |
| 3,668,374 | 6/1972 | Gamble............................. | 235/92 C |
| 3,846,803 | 11/1974 | Borgstrom .......................... | 346/95 |

*Primary Examiner*—Joseph M. Thesz, Jr.
*Attorney, Agent, or Firm*—Sherman & Shalloway

[57] ABSTRACT

A utility or service meter including print-out means stored in a tamper-proof zone of a housing and presentable to a record card insertable in the housing to print the accumulated total of the units of the service consumed.

13 Claims, 3 Drawing Figures

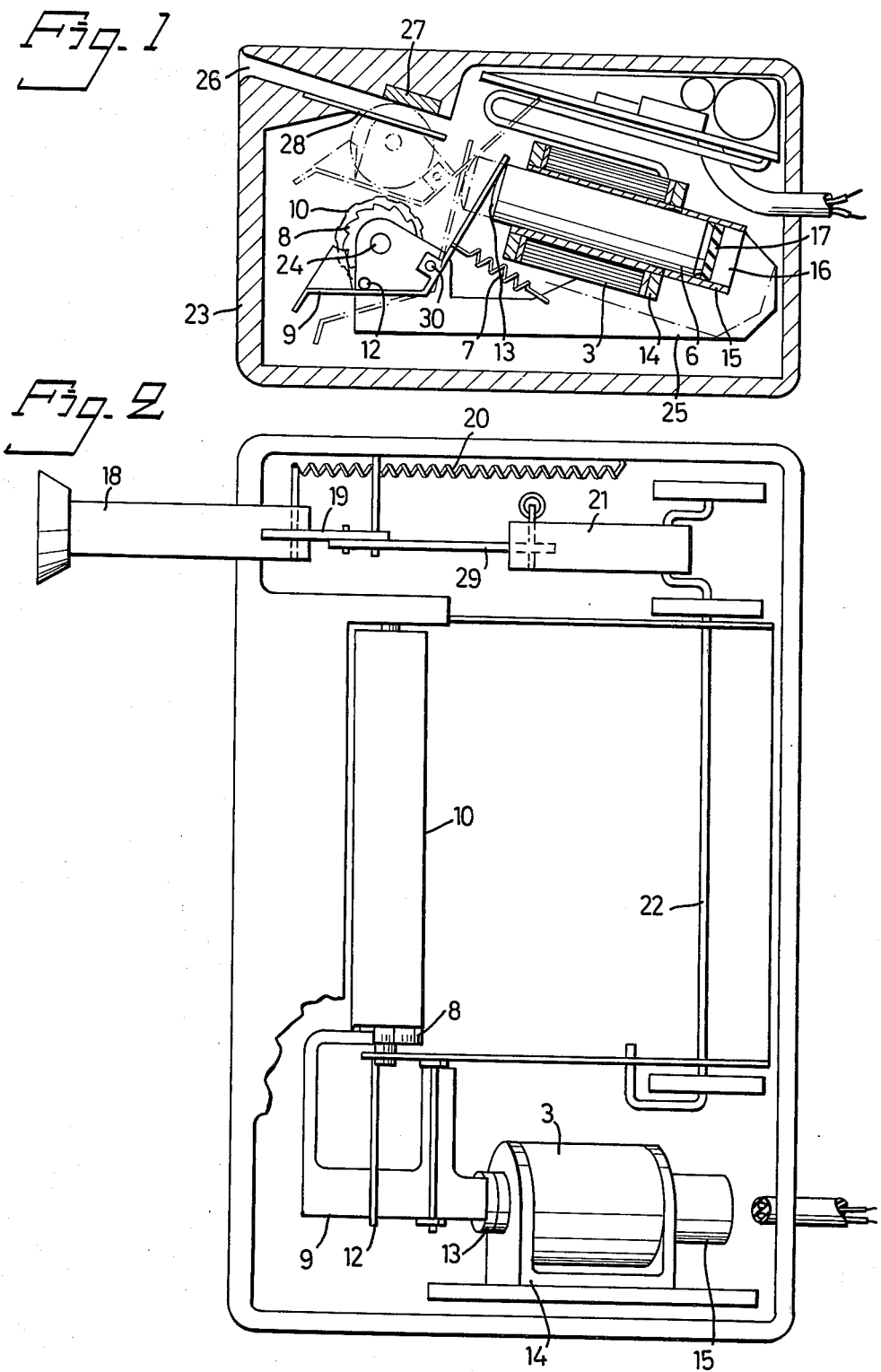

SERVICE METER WITH PULSE COUNTER

This invention relates to a pulse counter, particularly for dispensing consumption meters of the kind in which the consumed amount is printed, by means of numeral symbols, on a card which is insertable into a slot formed in the meter housing, said meter comprising an accumulating counting-mechanism which, upon actuation by a manual control means, is movable from an inoperative position concealed and protected in the housing to an operative card-stamping position adjacent said slot, in which position the counting mechanism prints with ink onto the card the consumption amount or value accumulated in the counting mechanism.

Measurement values from electricity, oil, water and heat meters usually are collected in such a manner, that a meter reader at least once a year calls upon the consumers and records the meter readings. The resulting meter values then require a certain manual procedure for invoicing. The supplier usually distributes invoices to the consumers three or four times a year, of which invoices the second and third are based on a consumption, which is estimated from the consumption in the preceding year, or stated by the consumer on a card provided for this purpose and to be mailed to the supplier. Outside Sweden, furthermore, a system has been tested in which the meter reader carries a tape recorder, which is connected at the consumer's place to the meter in question for recording the meter reading on tape, whereafter the values thus obtained are processed mechanically for invoicing.

The object of the invention is the improved collection of consumption values from meters of the aforesaid kind.

This object is achieved by a pulse counter for consumption meters.

The application of the invention, in practice, contemplates that the consumer reads the meter, but does not manually record the meter reading on a card intended for this purpose, with the errors which thereby may arise. The customer inserts a special card into the meter and the meter reading then is automatically stamped on the card. This involves, for the supplier, the advantage of being able to process these special cards mechanically in an optical reader and in a data processing machine for direct typing of invoices without labor being engaged. For the consumer, it involves the advantage that the invoiced charge is based on the electric energy, oil quantity and, respectively, water or heat quantity which is indicated on the stamped card and which actually had been consumed at the date of payment in question, and is not based on a consumption estimated by guessing.

The invention is described in greater detail in the following description, with reference to the accompanying drawing showing an embodiment, in which drawing FIG. 1 shows a meter provided with the special pulse counter according to the invention, which meter is shown from the side with a short wall removed, the inoperative position of the counting mechanism being shown in solid lines and its operative stamping position being indicated by dash-dotted lines.

FIG. 2 shows the meter according to FIG. 1 seen from above with a removed upper wall.

Figure 3:
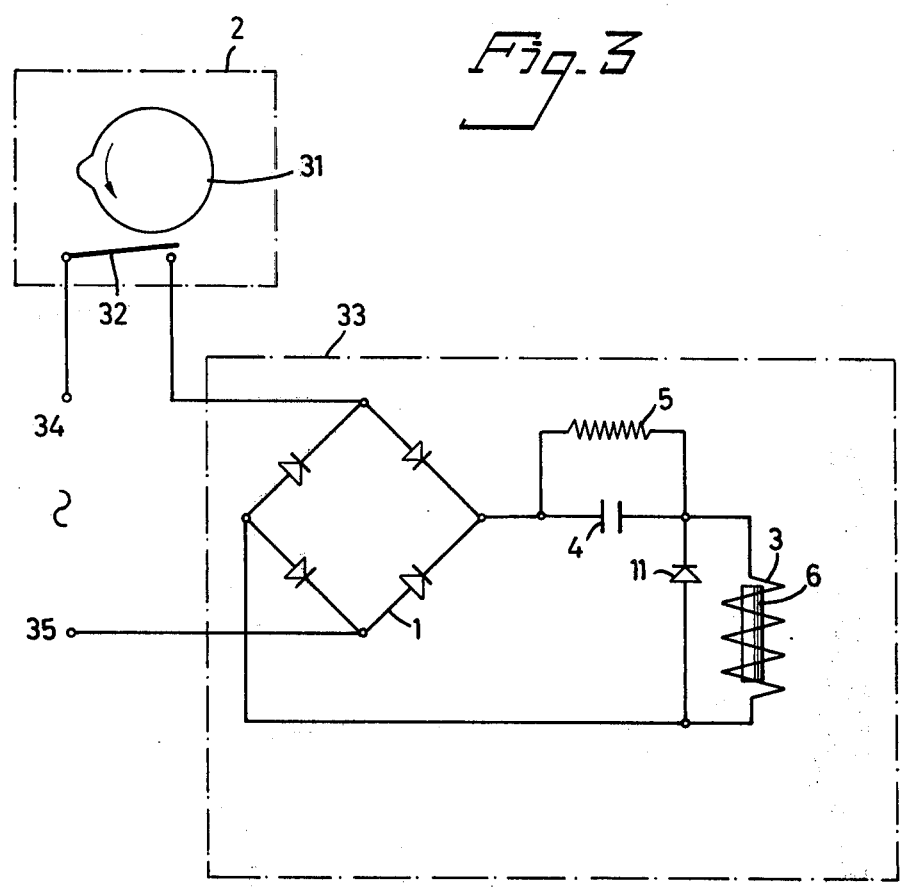
FIG. 3 shows the electric wiring diagram for the pulse counting part of the meter shown in FIGS. 1 and 2.

In FIG. 1 a service meter is shown which is provided with the special pulse counter according to the invention. The meter is enclosed in a housing 23 provided with a slot 26 for inserting therein a stamp card to be stamped. A stamp pad 27 is rigidly mounted at the upper wall of the card insert slot in the housing 23. A counting mechanism 10 comprising a plurality of counting wheels which are movable on a shaft 24 can be moved from an inoperative position, shown by solid lines, to an operative stamping position shown by dash-dotted lines. In the inoperative position, the counting mechanism 10 is located at a great distance from the slot 26, so that the counting mechanism wheels are not accessible from outside through the slot by means of a foreign object intended to manipulate the counting wheels. For the stamping operation, the counting mechanism 10 is impelled forward from its inoperative position; strikes with its printing types against the stamp card, and returns to its inoperative position. The stamping operation proper is released manually. The counting mechanism 10 is arranged in a counting mechanism stand 25, which is rotatably supported on a shaft 22 mounted in the housing 23 (FIG. 2), which shaft constitutes a torsion spring. The counting mchanism stand 25 has a U-shaped cross-section, as best shown in from FIG. 2. The lower wall of the card-insert slot 26 includes an aperture 28, through which the counting mechanism wheels, during the stamping operation, strike against the stamp card.

For releasing the stamping movement, a push-button 18 is actuated which can be pulled-out and pressed-in, relative to the meter housing. At the push-button end located within the housing, a lever link 19 is slidably and pivotally connected, which link, at its other end, is rockable at a shaft rigidly mounted in the housing. A second link 29 is rotatable at one end in a point between the ends of the link 19. The opposed end of the link 29 is rotatable with a tension link 21 adapted to tension the torsion spring 22 of the counting mechanism stand 25. A weak spring 20 holds the push-button 18 in inoperative position against the housing, after the stamping operation is effected. When stamping operation is desired, the button 18 is first pulled out to the position shown in FIG. 2. Thereby the toggle mechanism formed by the links 21 and 29 is straightened. For effecting stamping, the button 18 is thereafter forcefully moved inward toward the housing and thereby releases the stamping operation.

A toothed ratchet wheel 8 according to FIG. 1 is provided to advance the number wheels in the counting mechanism 10 by means of a feed-hook member 9, which is a pawl mounted on a lever and which is rockable about a pivot or shaft 30 and limited in its clockwise movement by a stop shoulder 12. The opposed end of the rockable feed-hook member 9 is actuated by a solenoid plunger 6, which at each pulse to be counted is advanced to the position shown by dash-dotted lines and thereby moves the feed-hook member 9 to its position, also shown by dash-dotted lines, against the action of a spring 7, one end of which is fastened to the feed-hook member with other end fastened to the counting mechanism stand 25. In operation, the spring 7 urges the lever of the feed-hook member 9 to rotate about the pivot or shaft 30 in a clockwise direction. Consequently, when the plunger 6 projects or advances, it rotates the feed-hook member 9 counterclockwise disengaging it from the ratchet wheel 8 and tensioning the spring 7. When the plunger 6 retracts back into the solenoid from which it projects, the spring 7 causes the feed-hook member to positively engage the ratchet wheel 8 and rotate the ratchet wheel clockwise. The plunger 6 is made of iron and slides in a magnet coil 3 held by a magnetic strap 14. A sleeve or pipe 15 of non-magnetic material, for example brass, extends through the strap 14 and magnet coil 3 and forms a slide surface for the plunger 6. Said pipe 15 is open at the end facing towards the feed-hook member 9. When the coil 3 has received a current pulse, and the plunger 6 has performed its work whilst tensioning the spring 7, the plunger is not stopped against the strap 14 as in a conventional electromagnet, but it can freely continue to deliver its excess kinetic energy to the spring 7. This effects the result that the kinetic energy is not transformed to impact energy, which would give rise to noise with a disturbing effect, for example in a dwelling. In order to improve the device still more so as to operate silently, the plunger 6 is provided with a plastic stud 13 at its end acting against the hook member 9. The pipe 15, furthermore, at the opposite end, is provided with a plug 16 and a damper 17 of a rubber-elastic material. When the plunger 6 has performed its work and is being returned by the spring 7 at a relatively high speed to its original position, the plunger is braked by the air cushion formed in the closed-end, damping chamber of the pipe 15 and finally by the damper 17. The braking, thus, takes place also in this direction softly and noiseless.

In FIG. 3 a wiring diagram for the electric components of the device is shown. The electric circuit comprises, in addition to the aforementioned magnet coil 3 with plunger 6, a number of components, which in FIG. 1 are indicated within the housing 23 farthest upwardly to the right.

The energy or volume consumed, for example kWh in an electricity meter or water or oil in a water-and-oil meter, respectively, controls a symbolically-shown pulse emitter or transmitter 2, which, of course, may be a component being conventionally incorporated in a consumption meter. The components incorporated in the device according to the invention, of course, can be so integrated with the known meter components that it results in an entirely new consumption meter design. In order to simplify the description, however, the meter according to the invention is assumed to be an addition to an existing consumption meter, for example, for consumed electric energy. The transmitter comprises a cam disc 31, which rotates proportionally to a predetermined number of service units representing the energy consumed. For each revolution of this cam disc a contact 32 is closed. The pulse meter 33 proper is supplied with current from the alternating-current mains between the terminals 34, 35 when the contact 32 is closed. The alternating current (220 V) is rectified in a rectifier bridge 1. In a consumption meter of the kind indicated, the consumption can be imagined to stop for a longer or shorter time when the contact 32 had been closed, so that this contact remains closed for a longer time. In other words, the pulses to the pulse meter 33 from the transmitter 2 can have a widely varying duration relative each other. In order to prevent the flow of current from the mains for a longer time through the pulse meter, and thereby heating of the magnet coil 3 and useless energy consumption, a capacitor 4 and a resistance 5 are inserted into the electric circuit between the rectifier bridge 1 and magnet coil 3. The coil thereby carries only a current which corresponds to the energy amount consumed for charging the capacitor 4. The capacitor and magnet coil are so dimensioned that the plunger 6 is capable to tension the spring 7 before the capacitor is fully charged. The charging time may be as short as 30 ms. After the plunger 6 has performed a forward stroke and thereafter reassumed its inoperative position, by action of the spring 7, and when the contact 32 then still is closed, (i.e., when the pulse to the pulse meter still remains), then only a small current of the magnitude 2 mA flows through the resistance 5 and coil 3. When the pulse from the transmitter 2 gradually ceases, the capacitor 4 is discharged within some seconds through the resistance 5, and the pulse counter 33 is ready to receive a new pulse from the transmitter 2 for recording in the counting mechanism 10 via the toothed wheel 8. A diode 11 connected in parallel with the magnet coil 3 has as its function to smooth the rectified, alternating-current pulse. This provides the possibility of selecting a smaller capacitor 4. If the pulse transmitter 2, instead of alternating-current pulses delivers direct-current pulses, the rectifier bridge 1 as well as the diode 11 are, of course, superfluous.

The invention has been described above in relation to a speial embodiment, but it can, of course, be modified in various ways within the scope of the claims.

I claim:

1. A service meter including
a housing having
totalling means for accumulating a total of service units consumed, said totalling means including:
a pulse counter,
pulse emitting means responsive to the consumption of a predetermined number of service units for emitting a pulse, said pulse emitting means including a contact and means for opening and closing said contact,
a solenoid including:
a coil connected to said pulse emitter and
a plunger advanced by said coil positioned to engage said pulse counter, said pulse counter including:
transmission means including a resistance-capacitance circuit in series with said pulse emitting means and said coil, whereby a current pulse from the pulse emitting means is applied to said coil immediately upon closing said contact, and a current is applied to said coil as long as said contact remains closed,
printing means, said printing means being mounted inaccessibly in said housing,
a card slot in said housing, and
means for selectively displacing said printing means toward said card slot to cause an imprint of the pulse counter total upon a card entered therein.

2. A meter as set forth in claim 1 in which said pulse counter includes a ratchet and a lever mechanism, and said plunger is positioned to engage said lever.

3. A meter as set forth in claim 2 including an elastic damper between said lever and said plunger.

4. A meter as set forth in claim 2 including a non-magnetic sleeve surrounding at least a portion of said plunger, said sleeve being closed at its end remote from the lever to form a damping chamber with said plunger.

5. A meter as set forth in claim 4 including an elastic damper between said lever and said plunger.

6. An apparatus for monitoring an amount of service units consumed comprising:

means for periodically generating pulses indicative of consumed service units;

solenoid means including a coil and a plunger movable by said coil upon energizing said coil;

means for applying said pulses to said coil to energize said coil;

tubular means for mounting said plunger for reciprocation within said coil, said tubular means being closed at one end, and said plunger being freely slidable with respect to said tubular means, except when engaging said closed end, lever means having pawl means thereon, said lever means being engaged by said plunger, and pivoted to rotate from a first position to a second position, as the plunger advances away from said closed end, a ratchet wheel engaged by said pawl means, said pawl means restraining said ratchet wheel from rotation, when said lever is in said first position, and rotating said wheel as said lever moves from said second position to said first position, biasing means for urging said lever to said first position from said second position to thereby drive said ratchet wheel in rotation, accumulating means indexed by said ratchet wheel for totalling the service units indicated by said pulses, printing means organized by said accumulating means, means for mounting said accumulating means printing means and lever means for displacement relative to said solenoid means, a housing enclosing said apparatus, and having a slot therein for receiving a card to be printed upon, and means for displacing said mounting means to register said printing means with said slot, to cause said printing means to record the accumulated amount of service units on a card inserted in said slot.

7. The apparatus of claim 6 wherein an elastic damper is disposed between said plunger and said lever to insure quiet cooperation therebetween.

8. The apparatus of claim 6 wherein said plunger and said tube form a pneumatic damper, in which air is compressed between the plunger and said closed end, as said biasing means returns said lever to said first position.

9. The apparatus of claim 8 wherein an elastic damper is disposed between said plunger and said lever to insure quiet cooperation therebetween.

10. The apparatus of claim 8 wherein said closed end is formed of resilient material.

11. The apparatus of claim 6 wherein said means for periodically generating pulses is an electrical contact, which when closed generates a pulse, and wherein said means for applying generated pulses to said coil includes a resistance-capacitance circuit in series with said electrical contact and said coil, whereby a current pulse from the pulse emitting means is applied to said coil immediately upon closing said contact, and a current is applied to said coil as long as said contact remains closed.

12. The apparatus of claim 11 wherein said resistance-capacitance circuit is comprised of a resistor and capacitor in parallel with one another.

13. The apparatus of claim 12 wherein the pulse is applied through an alternating current circuit, which includes rectifying means for converting alternating current to direct current for application to said coil.

* * * * *